(12) United States Patent
Schindler

(10) Patent No.: US 12,547,131 B2
(45) Date of Patent: Feb. 10, 2026

(54) APPARATUS, COMPUTER PROGRAM PRODUCT, AND METHOD FOR EVALUATING COURSE OF EFFICIENCY DEGRADATION IN CHILLERS

(71) Applicant: Honeywell International Inc., Charlotte, NC (US)

(72) Inventor: Zdenek Schindler, Prague (CZ)

(73) Assignee: Honeywell International Inc., Charlotte, NC (US)

( * ) Notice: Subject to any disclaimer, the term of this patent is extended or adjusted under 35 U.S.C. 154(b) by 368 days.

(21) Appl. No.: 18/309,313

(22) Filed: Apr. 28, 2023

(65) Prior Publication Data

US 2024/0361735 A1 Oct. 31, 2024

(51) Int. Cl.
*G05B 13/04* (2006.01)
(52) U.S. Cl.
CPC ......... *G05B 13/048* (2013.01); *G05B 13/042* (2013.01); *G05B 13/047* (2013.01)
(58) Field of Classification Search
CPC ... G05B 13/048; G05B 13/042; G05B 13/047
See application file for complete search history.

(56) References Cited

U.S. PATENT DOCUMENTS

| | | | |
|---|---|---|---|
| 2015/0185716 A1* | 7/2015 | Wichmann | F02C 9/28 700/287 |
| 2020/0090289 A1* | 3/2020 | Elbsat | G06Q 10/04 |
| 2021/0140664 A1* | 5/2021 | Roth | F24F 11/38 |

* cited by examiner

*Primary Examiner* — Gary Collins
(74) *Attorney, Agent, or Firm* — Alston & Bird LLP

(57) ABSTRACT

Methods, apparatuses, and computer program products are disclosed for monitoring chiller efficiency degradation. An example method receives a first data set comprising chiller operations data and chiller efficiency data over a first time interval. The method receives a second data set comprising chiller operations data and chiller efficiency data over a second time interval. The method generates, with the machine learning model, a data prediction based upon the first data set and the chiller operations data of the second data set, wherein the data prediction comprises expected chiller efficiency data over the second time interval. The method determines a chiller efficiency degradation level based on a difference between the data prediction and the chiller efficiency data of the second data set.

18 Claims, 10 Drawing Sheets

APPARATUS, COMPUTER PROGRAM PRODUCT, AND METHOD FOR EVALUATING COURSE OF EFFICIENCY DEGRADATION IN CHILLERS

TECHNOLOGICAL FIELD

Example embodiments of the present invention relate generally to monitoring efficiency of chillers and, more particularly, to determining optimal maintenance time.

BACKGROUND

Chillers over time experience a drop in efficiency. Often, such chillers degrade to cause such drops in efficiency.

BRIEF SUMMARY

Systems, apparatuses, methods, and computer program products are disclosed herein for performing chiller degradation monitoring and determining optimal timing of maintenance. In an example embodiment, an apparatus is provided comprising at least one processor and at least one non-transitory memory including computer-coded instructions thereon, the computer-coded instructions configured to, with the at least one processor, cause the apparatus to receive a first data set comprising chiller operations data and chiller efficiency data over a first time interval. The at least one memory and the computer-coded instructions are further configured to receive a second data set comprising chiller operations data and chiller efficiency data over a second time interval The at least one memory and the computer-coded instructions are further configured to generate, with a machine learning model, a data prediction based upon the first data set and the chiller operations data of the second data set, wherein the data prediction comprises expected chiller efficiency data over the second time interval. The at least one memory and the computer-coded instructions are further configured to determine a chiller efficiency degradation level based on a difference between the data prediction and the chiller efficiency data of the second data set.

In an example embodiment, the chiller operations data of the first data set and the second data set comprises at least one of temperature of a cooling medium entering a condenser, temperature of the cooling medium leaving the condenser, volumetric flow rate of the cooling medium, mass flow rate of the cooling medium, temperature of a chilled medium entering an evaporator, temperature of the chilled medium leaving the evaporator, volumetric flow rate of the chilled medium, mass flow rate of the chilled medium, and compressor power consumption.

In an example embodiment, the chiller efficiency data of the first data set, the data prediction, and the second data set comprise at least one of coefficient of performance and power consumption In an example embodiment, the at least one memory and the computer-coded instructions are further configured to determine a predicted coefficient of performance based on the data prediction. The at least one memory and the computer-coded instructions are further configured to determine a recorded coefficient of performance based on the chiller efficiency data of the second data set. The at least one memory and the computer-coded instructions are further configured to determine a coefficient of performance degradation level based on a difference between the predicted coefficient of performance and the recorded coefficient of performance.

In an example embodiment, the at least one memory and the computer-coded instructions are further configured to determine a coefficient of performance prediction error based at least on the coefficient of performance degradation level, wherein the coefficient of performance prediction error describes a coefficient of performance degradation level over time, and wherein the coefficient of performance prediction error is shifted to begin at a level indicating no degradation.

In an example embodiment, the at least one memory and the computer-coded instructions are further configured to determine an amount of energy wasted over time based on coefficient of performance degradation level.

In an example embodiment, the at least one memory and the computer-coded instructions are further configured to determine an excess expenditure value time profile based on the amount of energy wasted.

In an example embodiment, the at least one memory and the computer-coded instructions are further configured to determine an optimal maintenance time based on the excess expenditure value time profile and a cost of maintenance.

In an example embodiment, the at least one memory and the computer-coded instructions are further configured to determine the first time interval based at least on a temperature of a cooling medium entering a condenser and a cooling demand load.

In an example embodiment, the at least one memory and the computer-coded instructions are further configured to smooth the first data set, wherein the first data set is smoothed based at least on a third time interval that is longer than a basic sampling time interval and encompasses the basic sampling time interval.

In an example embodiment, the machine learning model comprises a regression model.

In an example embodiment, the machine learning model is trained based on the first data set.

In an example embodiment, a method is provided, comprising receiving a first data set comprising chiller operations data and chiller efficiency data over a first time interval. The method further comprises receiving a second data set comprising chiller operations data and chiller efficiency data over a second time interval. The method further comprises generating, with a machine learning model, a data prediction based upon the first data set and the chiller operations data of the second data set, wherein the data prediction comprises expected chiller efficiency data over the second time interval. The method further comprises determining a chiller efficiency degradation level based on a difference between the data prediction and the chiller efficiency data of the second data set.

In an example embodiment, the chiller operations data of the first data set and the second data set comprises at least one of temperature of a cooling medium entering a condenser, temperature of the cooling medium leaving the condenser, volumetric flow rate of the cooling medium, mass flow rate of the cooling medium, temperature of a chilled medium entering an evaporator, temperature of the chilled medium leaving the evaporator, volumetric flow rate of the chilled medium, mass flow rate of the chilled medium, and compressor power consumption.

In an example embodiment, the chiller efficiency data of the first data set, the data prediction, and the second data set comprise at least one of coefficient of performance and power consumption The method of an example embodiment further comprises determining a predicted coefficient of performance based on the data prediction. The method further comprises determining a recorded coefficient of performance based on the chiller efficiency data of the second data set. The method further comprises determining a coefficient of performance degradation level based on a difference between the predicted coefficient of performance and the recorded coefficient of performance.

The method of an example embodiment further comprises determining a coefficient of performance prediction error based at least on the coefficient of performance degradation level, wherein the coefficient of performance prediction error describes a coefficient of performance degradation level over time, and wherein the coefficient of performance prediction error is shifted to begin at a level indicating no degradation.

The method of an example embodiment further comprises determining an amount of energy wasted over time based on coefficient of performance degradation level.

The method of an example embodiment further comprises determining an excess expenditure value time profile based on the amount of energy wasted.

The method of an example embodiment further comprises determining an optimal maintenance time based on the excess expenditure value time profile and a cost of maintenance.

The method of an example embodiment further comprises determining the first time interval based at least on a temperature of a cooling medium entering a condenser and a cooling demand load.

The method of an example embodiment further comprises smoothing the first data set, wherein the first data set is smoothed based at least on a third time interval that is longer than a basic sampling time interval and encompasses the basic sampling time interval.

In an example embodiment, the machine learning model comprises a regression model.

In an example embodiment, the machine learning model is trained based on the first data set.

In an example embodiment, a non-transitory computer readable storage medium is provided comprising computer coded instructions that, when executed by an apparatus, cause the apparatus to receive a first data set comprising chiller operations data and chiller efficiency data over a first time interval. The non-transitory computer readable storage medium further includes computer instructions configured, upon execution, to receive a second data set comprising chiller operations data and chiller efficiency data over a second time interval. The non-transitory computer readable storage medium further includes computer instructions configured, upon execution, to generate, with a machine learning model, a data prediction based upon the first data set and the chiller operations data of the second data set, wherein the data prediction comprises expected chiller efficiency data over the second time interval. The non-transitory computer readable storage medium further includes computer instructions configured, upon execution, to determine a chiller efficiency degradation level based on a difference between the data prediction and the chiller efficiency data of the second data set.

In an example embodiment, the chiller operations data of the first data set and the second data set comprises at least one of temperature of a cooling medium entering a condenser, temperature of the cooling medium leaving the condenser, volumetric flow rate of the cooling medium, mass flow rate of the cooling medium, temperature of a chilled medium entering an evaporator, temperature of the chilled medium leaving the evaporator, volumetric flow rate of the chilled medium, mass flow rate of the chilled medium, and compressor power consumption.

In an example embodiment, the chiller efficiency data of the first data set, the data prediction, and the second data set comprise at least one of coefficient of performance and power consumption.

The non-transitory computer readable storage medium of an example embodiment further includes computer instructions configured, upon execution, to determine a predicted coefficient of performance based on the data prediction. The non-transitory computer readable storage medium further includes computer instructions configured, upon execution, to determine a recorded coefficient of performance based on the chiller efficiency data of the second data set. The non-transitory computer readable storage medium further includes computer instructions configured, upon execution, to determine a coefficient of performance degradation level based on a difference between the predicted coefficient of performance and the recorded coefficient of performance.

The non-transitory computer readable storage medium of an example embodiment further includes computer instructions configured, upon execution, to determine a coefficient of performance prediction error based at least on the coefficient of performance degradation level, wherein the coefficient of performance prediction error describes a coefficient of performance degradation level over time, and wherein the coefficient of performance prediction error is shifted to begin at a level indicating no degradation.

The non-transitory computer readable storage medium of an example embodiment further includes computer instructions configured, upon execution, to determine an amount of energy wasted over time based on coefficient of performance degradation level.

The non-transitory computer readable storage medium further includes computer instructions configured, upon execution, to determine an excess expenditure value time profile based on the amount of energy wasted.

The non-transitory computer readable storage medium further includes computer instructions configured, upon execution, to determine an optimal maintenance time based on the expenditure value time profile and a cost of maintenance.

The non-transitory computer readable storage medium further includes computer instructions configured, upon execution, to determine the first time interval based at least on a temperature of a cooling medium entering a condenser and a cooling demand load.

The non-transitory computer readable storage medium further includes computer instructions configured, upon execution, to smooth the first data set, wherein the first data set is smoothed based at least on a third time interval that is longer than a basic sampling time interval and encompasses the basic sampling time interval.

In an example embodiment, the machine learning model comprises a regression model.

In an example embodiment, the machine learning model is trained based on the first data set.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1:
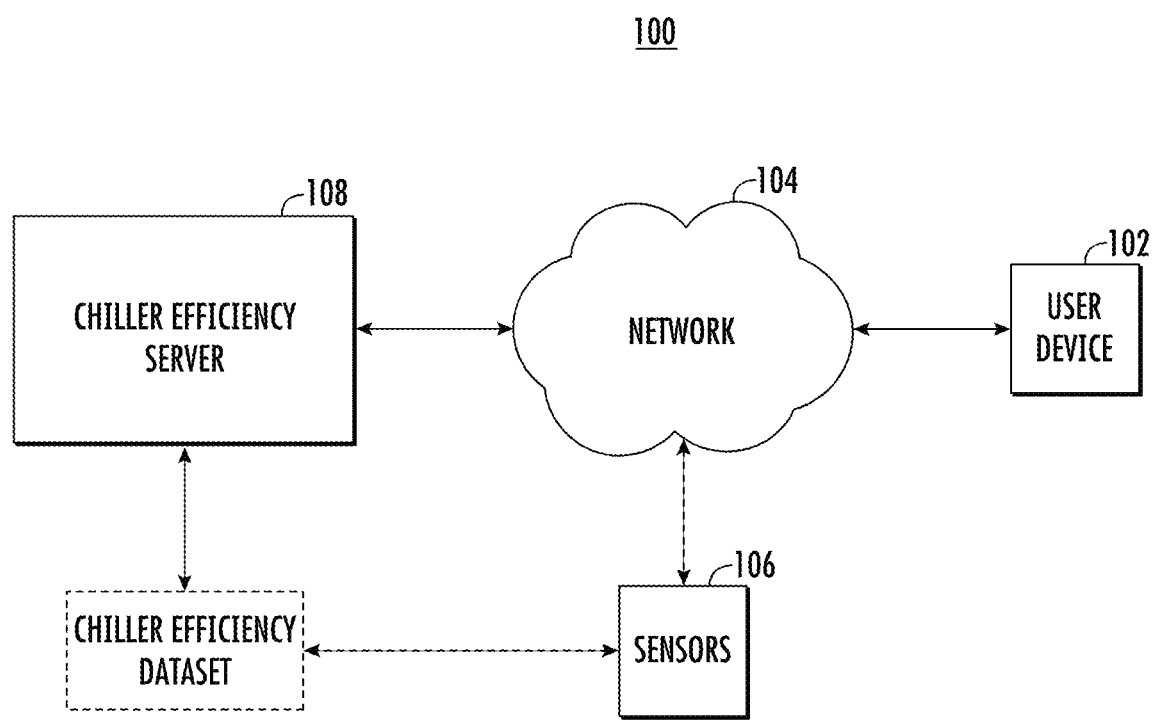
FIG. 1 illustrates a system diagram including devices that may be involved in some example embodiments described herein.

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the description may refer to a chiller efficiency server as an example "apparatus." However, elements of the apparatus described herein may be equally applicable to the claimed method and computer program product. Thus, use of any such terms should not be taken to limit the spirit and scope of embodiments of the present invention.

Definition of Terms

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used herein to mean "serving as an example, instance, or illustration." Any implementation described herein as "example" is not necessarily to be construed as preferred or advantageous over other implementations.

As used herein, the terms "user device," "mobile device," "electronic device" and the like refer to computer hardware that is configured (either physically or by the execution of software) to access one or more services made available by a chiller efficiency server (e.g., apparatus or computing device of the present disclosure) and, among various other functions, is configured to directly, or indirectly, transmit and receive data. Example user devices may include a smartphone, a tablet computer, a laptop computer, a wearable device (e.g., smart glasses, smart watch, or the like), and the like. In some embodiments, a user device may include a "smart device" that is equipped with a chip or other electronic device that is configured to communicate with the apparatus via Bluetooth, NFC, Wi-Fi, 3G, 4G, 5G, RFID protocols, and the like. By way of a particular example, a user device may be a mobile phone equipped with a Wi-Fi radio that is configured to communicate with a Wi-Fi access point that is in communication with the chiller efficiency server 108 or other computing device via a network.

As used herein, the term "sensor" or "sensors" refer to any object, device, or system which may be in network communication with the chiller efficiency server and/or the user device. The sensors may be configured to generate chiller efficiency data and iteratively transmit this data to the chiller efficiency server 108. For example, the sensors may refer to a temperature sensor configured to determine the temperature of a chilled medium proximate the sensors (e.g., in degrees Celsius or the like).

As used herein, the term "chiller efficiency dataset" refers to a data structure or repository for storing chiller operations data (e.g., sensor data, ambient conditions, chiller input data, chiller output data, temperature data, time data, flow rate data, and power data) and chiller efficiency data (e.g., coefficient of performance or power consumption) and the like. The chiller efficiency dataset may be accessible by one or more software applications of the chiller efficiency server 108.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

Having set forth a series of definitions called-upon throughout this application, an example system architecture and example apparatus is described below for implementing example embodiments and features of the present disclosure.

Overview

Often, various electrical and/or mechanical components, for example a chiller, will degrade over time due to any of a myriad of internal and/or external influences. As a result, an older chiller will consume more power in order to produce the same chilling effect as a new chiller. As older chillers consumer more energy, that wasted energy translates into increased costs over time for the same chiller performance. It is desirable to monitor chiller efficiency degradation to determine an optimal maintenance time for maintaining chiller efficiency while simultaneously minimizing maintenance resource expenditure and minimizing costs.

Embodiments provide for improved monitoring of chiller efficiency and maintenance optimization. For example, embodiments provide technical advantages by accurately determining a degradation level of a chiller. In one or more embodiments, an accurate level of degradation in a chiller is provided by determining a difference between collected data to data predicted using a machine learning model.

As an additional example, embodiments provide technical advantages by accurately predicting future degradation of a chiller based on a determined level of degradation. In one or more embodiments, a degradation level can be predicted ahead of time using the accurate level of degradation determined by embodiments herein.

As an additional example, embodiments provide technical advantages by optimizing chiller maintenance. In one or more embodiments, a predicted degradation level can be analyzed to determine an optimal time to perform maintenance on the chiller. Performing maintenance at an optimal time reduces energy expenditure compared to a chiller that has maintenance performed after the optimal time.

As an additional example, embodiments herein provide technical advantages by causing long-term energy consumption of a chiller to be reduced. In one or more embodiments, by determining an accurate level of degradation and performing maintenance at an optimal time, chiller energy consumption can be reduced compared to chillers that have maintenance performed after the optimal maintenance time.

Device Architecture and Example Apparatus

With reference to FIG. 1, an example system 100 is illustrated with an apparatus (e.g., a chiller efficiency server 108 as described further herein) communicably connected via a network 104 to a user device 102 and sensors 106. The example system 100 may also include a chiller efficiency dataset 110 that may be hosted by the chiller efficiency server 108 or otherwise hosted by devices in communication with the chiller efficiency server 108.

The chiller efficiency server 108 may include circuitry, networked processors, or the like configured to perform some or all of the apparatus-based (e.g., chiller efficiency server-based) processes described herein, and may be any suitable network server and/or other type of processing device. Chiller efficiency server 108 may include one or more server(s), database(s), computing device(s), and/or the like connected by one or more communication networks. In this regard, chiller efficiency server 108 may be embodied by any of a variety of devices. For example, the chiller efficiency server 108 may be configured to receive/transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 2 and described in connection therewith. In some embodiments, the chiller efficiency server 108 may be located remotely from the sensors 106, the user device 102, and/or chiller efficiency dataset 110, although in other embodiments, the chiller efficiency server 108 may comprise the sensors 106, the user device 102, and/or the chiller efficiency dataset 110. The chiller efficiency server 108 may, in some embodiments, comprise several servers or computing devices performing interconnected and/or distributed functions. Said differently, in some embodiments the chiller efficiency server 108 may be configured as a locally-hosted server, a cloud-based server, a distributed server, or a peer-to-peer network of connected devices (e.g., user devices comprising the chiller efficiency server functionality). Regardless of such arrangements contemplated herein, the chiller efficiency server 108 is shown and described herein as a single computing device to avoid unnecessarily overcomplicating the disclosure.

The network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network 104 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the network 104 may include a public network, such as the Internet, a private network, such as an intranet, or combinations thereof, and may utilize a variety of networking protocols now available or later developed including, but not limited to TCP/IP based networking protocols.

The user device 102 may refer to a mobile device associated with a user and may be a cellular telephone (e.g., a smartphone and/or other type of mobile telephone), laptop, desktop, tablet, electronic reader, e-book device, media device, wearable, smart glasses, smartwatch, or any combination of the above. Although only a user device 102 is illustrated, the example system 100 may include any number of user devices associated with the same user or any number of respective other users. By way of example, in an instance in which the example system 100 operates as a peer-to-peer networking, the chiller efficiency server 108 may be in communication with a plurality of user devices.

As noted above, the sensors 106 may refer to any object, device, or system which may be in network communication with the chiller efficiency server and/or the user device and configured to generate chiller operations data. For example, the sensors may refer to a temperature sensor configured to determine the temperature of a chilled medium proximate the sensors (e.g., in degrees Celsius or the like). While described herein with reference to temperature, volumetric flow rate, and power consumption sensors, the present disclosure contemplates that any number of additional sensors may be used to determine efficiency levels of a chiller (e.g., through pressure or the like) and/or that the sensors 106 may be configured to determine one or more additional operating parameters of the system 100.

The chiller efficiency dataset 110 may be stored by any suitable storage device configured to store some or all of the information described herein (e.g., memory 204 of the chiller efficiency server 108 or a separate memory system separate from the chiller efficiency server 108, such as one or more database systems, backend data servers, network databases, cloud storage devices, or the like provided by another device (e.g., online application or $3^{rd}$ party provider) or the user device 102). The chiller efficiency dataset 110 may comprise data received from the chiller efficiency server 108 (e.g., via a memory 204 and/or processor(s) 202), the sensors 106, or the user device 102, and the corresponding storage device may thus store this data.

Figure 2:
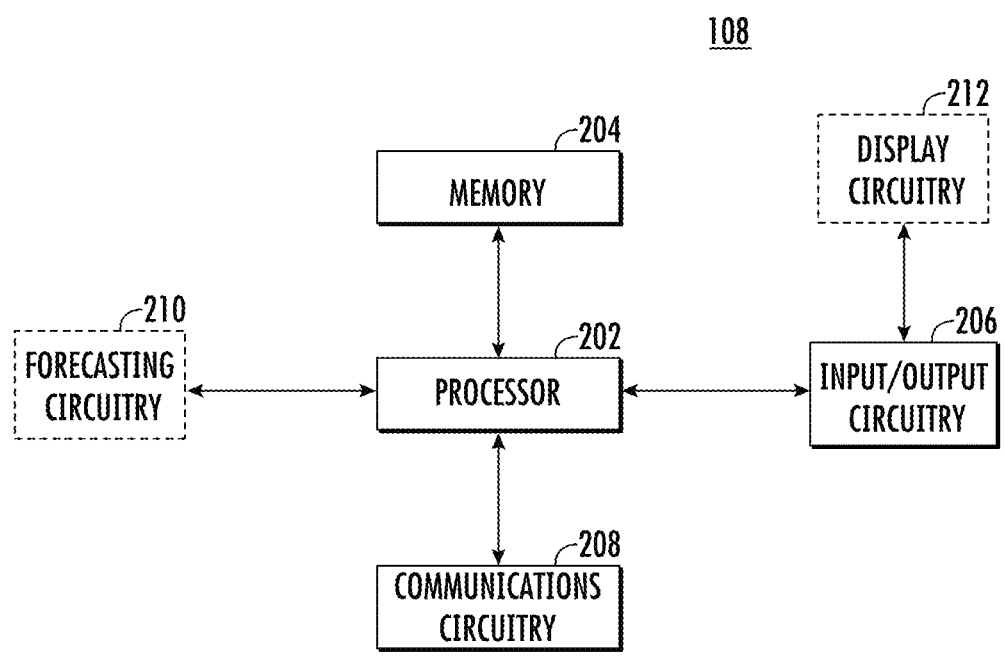
FIG. 2 illustrates a schematic block diagram of example circuitry that may perform various operations, in accordance with some example embodiments described herein.

As illustrated in FIG. 2, the chiller efficiency server 108 may include a processor 202, a memory 204, communications circuitry 208, input/output circuitry 206, and, in some embodiments, display circuitry 212 and forecasting circuitry 210. The chiller efficiency server 108 may be configured to execute the operations described below in connection with FIGS. 9-10. Although components 202-212 are described in some cases using functional language, it should be understood that the particular implementations necessarily include the use of particular hardware. It should also be understood that certain of these components 202-212 may include similar or common hardware. For example, two sets of circuitry may both leverage use of the same processor 202, memory 204, communications circuitry 208, or the like to perform their associated functions, such that duplicate hardware is not required for each set of circuitry. The use of the term "circuitry" as used herein includes particular hardware configured to perform the functions associated with respective circuitry described herein. As described in the example above, in some embodiments, various elements or components of the circuitry of the chiller efficiency server 108 may be housed within the sensors 106 and/or the user device 102. It will be understood in this regard that some of the components described in connection with the chiller efficiency server 108 may be housed within one of these devices, while other components are housed within another of these devices, or by yet another device not expressly illustrated in FIG. 1.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the chiller efficiency server 108 may provide or supplement the functionality of particular circuitry.

In some embodiments, the processor 202 (and/or co-processor or any other processing circuitry assisting or otherwise associated with the processor) may be in communication with the memory 204 via a bus for passing information among components of the chiller efficiency server 108. The memory 204 may be non-transitory and may include, for example, one or more volatile and/or non-volatile memories. In other words, for example, the memory may be an electronic storage device (e.g., a non-transitory computer readable storage medium). The memory 204 may be configured to store information, data, content, applications, instructions, or the like, for enabling the chiller efficiency server 108 to carry out various functions in accordance with example embodiments of the present invention.

The processor 202 may be embodied in a number of different ways and may, for example, include one or more processing devices configured to perform independently. Additionally, or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the chiller efficiency server, and/or remote or "cloud" processors.

In an example embodiment, the processor 202 may be configured to execute instructions stored in the memory 204 or otherwise accessible to the processor 202. Alternatively, or additionally, the processor 202 may be configured to execute hard-coded functionality. As such, whether configured by hardware or by a combination of hardware with software, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

The chiller efficiency server 108 further includes input/output circuitry 206 that may, in turn, be in communication with processor 202 to provide output to a user and to receive input from a user, user device, or another source. In this regard, the input/output circuitry 206 may comprise display circuitry 212 that may be manipulated by a mobile application. In some embodiments, the input/output circuitry 206 may also include additional functionality such as a keyboard, a mouse, a joystick, a touch screen, touch areas, soft keys, a microphone, a speaker, or other input/output mechanisms. The processor 202 and/or user interface circuitry comprising the processor 202 may be configured to control one or more functions of a display through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the chiller efficiency server 108. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s). These signals may be transmitted by the chiller efficiency server 108 using any of a number of wireless personal area network (PAN) technologies, such as Bluetooth® v 1.0 through v 3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

The forecasting circuitry 210 includes hardware components designed to generate coefficient of performance forecasts, and power consumption forecasts. The forecasting circuitry 210 may utilize processing circuitry, such as the processor 202, to perform its corresponding operations, and may utilize memory 204 to store collected information. By way of example, in some instances, the forecasting circuitry 210 may query the chiller efficiency dataset 110 to receive chiller operations data and/or chiller efficiency data. In one or more embodiments, the forecasting circuitry 210 calculates chiller efficiency data based on chiller operations data.

In addition, computer program instructions and/or other type of code may be loaded onto a computer, processor or other programmable chiller efficiency server's circuitry to produce a machine, such that the computer, processor other programmable circuitry that execute the code on the machine create the means for implementing the various functions, including those described in connection with the components of chiller efficiency server 108.

As described above and as will be appreciated based on this disclosure, embodiments of the present invention may be configured as systems, methods, mobile devices, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Example Operations for Chiller Efficiency Monitoring and Maintenance

Figure 3:
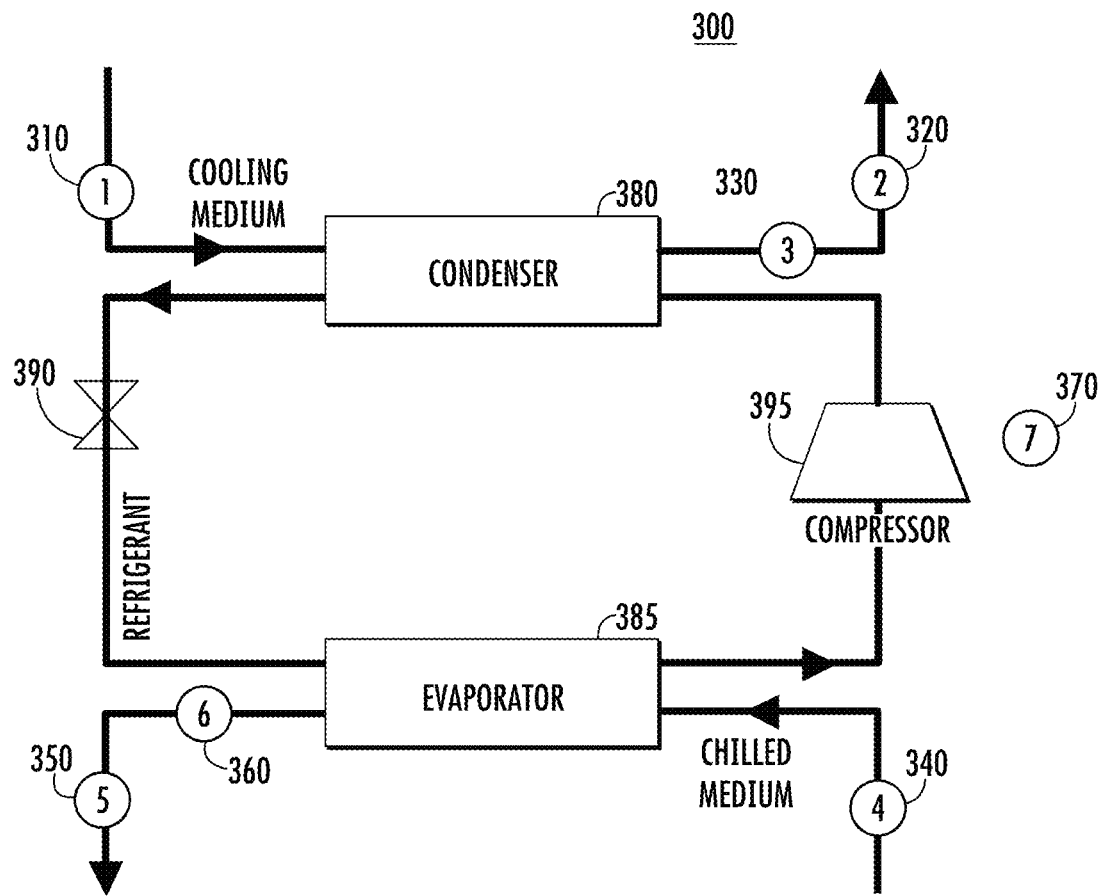
FIG. 3 illustrates an example chiller and set of chiller sensors, in accordance with some example embodiments described herein.

Turning now to FIG. 3, an example chiller 300 and sensors are illustrated. The illustrated chiller 300 comprises a vapor cooling type chiller using a liquid cooling medium that runs through condenser 380 and a liquid chilled medium running through evaporator 385. However, the illustrated embodiment is not limiting of types of chillers that may be used. For example, another example embodiment may comprise a chiller using gas media. Other types of chiller embodiments recognized by one of ordinary skill in the art may be applied to these embodiments.

In one or more embodiments, chiller 300 comprises expansion valve 390, compressor 395, condenser 380, and evaporator 385. In one or more embodiments, a cooling medium runs through the condenser. In one or more embodiments, a chilled medium runs through an evaporator. In one or more embodiments, a refrigerant runs through the condenser 380, evaporator 385, expansion valve 390, and/or compressor 395. In one or more embodiments, power is given to the compressor 395. In one or more alternative embodiments, power may be given to another component of chiller 300.

In an example embodiment, sensor 310 comprises a temperature sensor configured to read the temperature of a cooling medium prior to the cooling medium entering condenser 380. Sensor 310 may comprise any type of temperature sensor such as a thermocouple, resistance temperature detector, thermistor, semiconductor based integrated circuit, or the like. In one or more embodiments, temperature sensor 320 is configured to read the temperature of the cooling medium after the cooling medium passes through condenser 380. Sensor 320 may comprise any type of temperature sensor such as a thermocouple, resistance temperature detector, thermistor, semiconductor based integrated circuit, or the like. In one or more embodiments, the difference between the temperature read by sensor 310 and sensor 320 may be stored in the chiller efficiency dataset as chiller operations data. In one or more embodiments, the individual temperatures read by sensor 310 and/or sensor 320 may be stored in the chiller efficiency dataset as chiller operations data. The placement of sensor 310 and sensor 320 are provided as examples, and the temperature of the cooling medium may be taken within a range of locations near condenser 380. In one or more embodiments, the temperature read by sensor 310 is represented by variable cwrtemp. In one or more embodiments, the temperature read by sensor 320 is represented by variable cwstemp.

In one or more embodiments, sensor 330 is configured to read the volumetric or mass flow rate of the cooling medium after the cooling medium has passed through condenser 380. Sensor 330 may comprise any type of volumetric or mass flow sensor such as a positive displacement flow meter, turbine flow meter, electromagnetic flow meter, vortex meter, ultrasonic flow meter, intertia meter, thermal meter, or the like. In one or more embodiments, sensor 330 may be placed before the cooling medium enters the condenser 380 and read the volumetric or mass flow rate prior to the cooling medium entering condenser 380. In one or more embodiments, sensor 330 may be placed after the cooling medium leaves condenser 380 and read the volumetric or mass flow rate after the cooling medium leaves condenser 380. In one or more embodiments, the volumetric flow rate read by sensor 330 may be stored in the chiller efficiency dataset as chiller operations data. In one or more embodiments, the volumetric flow rate read by sensor 330 is represented by variable cwflow.

In an example embodiment, sensor 340 comprises a temperature sensor configured to read the temperature of a chilled medium prior to the chilled medium entering evaporator 385. Sensor 340 may comprise any type of temperature sensor such as a thermocouple, resistance temperature detector, thermistor, semiconductor based integrated circuit, or the like. In one or more embodiments, temperature sensor 350 is configured to read the temperature of the chilled medium after the chilled medium passes through evaporator 385. Sensor 350 may comprise any type of temperature sensor such as a thermocouple, resistance temperature detector, thermistor, semiconductor based integrated circuit, or the like. In one or more embodiments, the difference between the temperature read by sensor 340 and sensor 350 may be stored in the chiller efficiency dataset as chiller operations data. In one or more embodiments, the individual temperatures read by sensor 340 and/or sensor 350 may be stored in the chiller efficiency dataset as chiller operations data. The placement of sensor 340 and sensor 350 are provided as examples, and the temperature of the chilled medium may be taken within a range of locations near evaporator 385. In one or more embodiments, the temperature read by sensor 340 is represented by variable chwrtemp. In one or more embodiments, the temperature read by sensor 350 is represented by variable chwstemp.

In one or more embodiments, sensor 360 is configured to read the volumetric or mass flow rate of the chilled medium after the chilled medium has passed through evaporator 385. Sensor 360 may comprise any type of volumetric or mass flow sensor such as a positive displacement flow meter, turbine flow meter, electromagnetic flow meter, vortex meter, ultrasonic flow meter, intertia meter, thermal meter, or the like. In one or more embodiments, sensor 360 may be placed before the chilled medium enters the evaporator 385 and read the volumetric or mass flow rate prior to the chilled medium entering evaporator 385. In one or more embodiments, sensor 360 may be placed after the chilled medium leaves evaporator 385 and read the volumetric or mass flow rate after the chilled medium leaves evaporator 385. In one or more embodiments, the volumetric flow rate read by sensor 360 may be stored in the chiller efficiency dataset as chiller operations data. In one or more embodiments, the volumetric flow rate read by sensor 360 is represented by variable chwflow.

In one or more embodiments, sensor 370 reads the compressor power consumption of compressor 395. Sensor 370 may comprise any type of power sensor such as a current transformer, hall effect sensor, inductive sensor, direct measurement sensor, electrical power sensor, or the like. In one or more embodiments, the power consumption read by sensor 370 may be stored in the chiller efficiency dataset as chiller operations data. In one or more embodiments, the power consumption read by sensor 370 is represented by $p_{comp}$.

In one or more embodiments, chiller efficiency data may be determined based on chiller operations data. In one or more embodiments, chiller efficiency data is a coefficient of performance. In one or more embodiments, chiller efficiency data is a level of power consumption. In one or more embodiments, chiller efficiency data is an energy expenditure level.

In one or more embodiments, the data collected by sensors 310-370 may be smoothed. In one or more embodiments, smoothing may be performed on the data due to natural noise in the data. In one or more embodiments, appropriate filtering of the data may be performed before and after data processing. In one or more embodiments, filtering may occur only before or only after data processing. In one or more embodiments, smoothing comprises averaging the data over a longer period of time than the time period which the data represents. In one or more embodiments, smoothing comprises determining a moving average. For example, a for one minute of collecting data, a ten minute average may be applied. In one or more embodiments, this means that the average minute over the previous 10 minutes of data may be taken to represent a minute of data. In one or more embodiments, shorter and longer time periods may be used to smooth the data. In one or more embodiments, a ten minute average is applied to one minute of data prior to data processing and a six hour average is applied to the data after processing. In one or more embodiment, smoothing comprises time resampling. For example, time resampling may be used by changing time sampling intervals. For example, in a circumstance where sampling intervals change from one minute to ten minutes, each ten minute sample is assigned the average of the last ten one minute samples. In one or more embodiments, results are further smoothed for clarity to show degradation, which may occur slowly.

Figure 4:
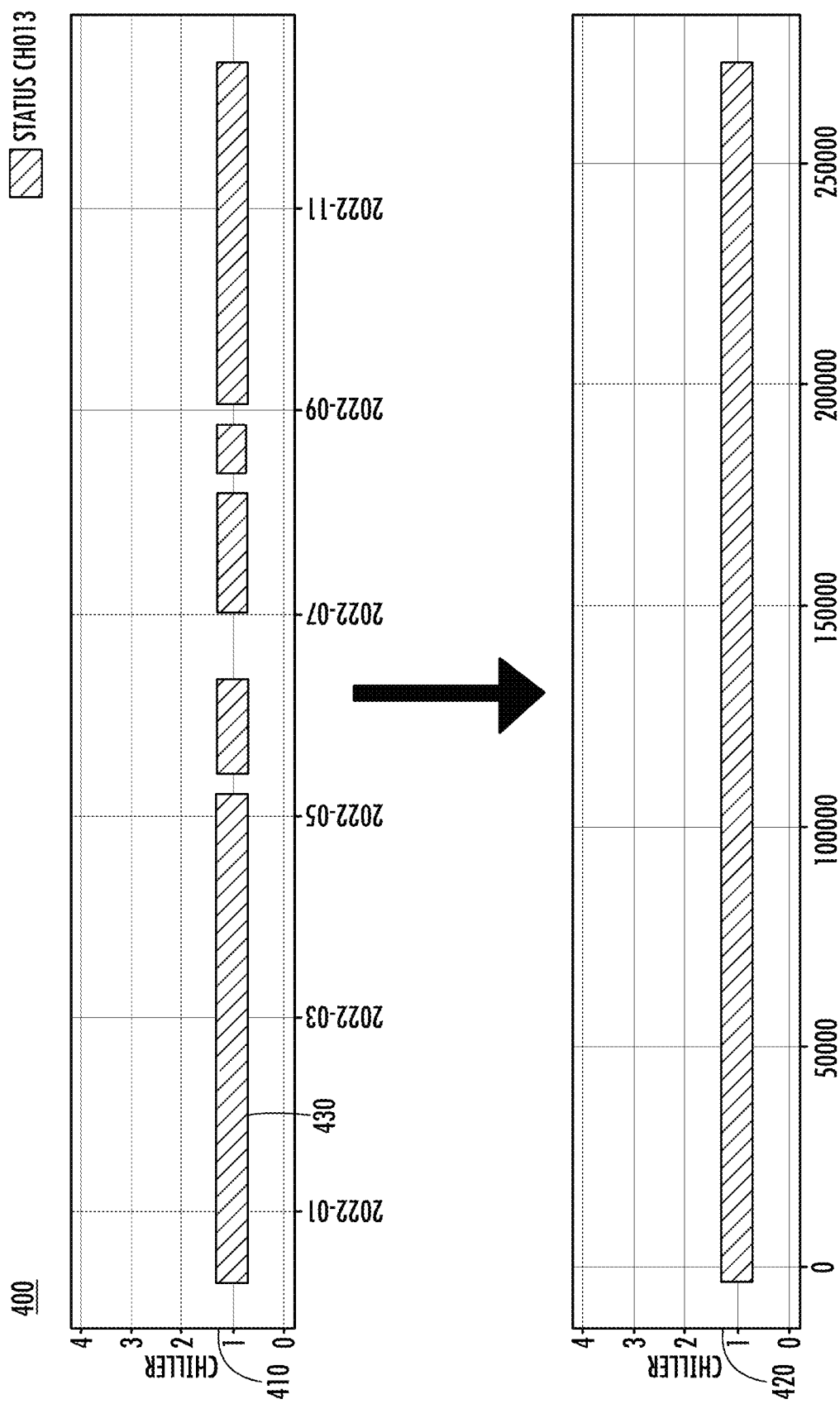
FIG. 4 illustrates example graphs of chiller status, in accordance with some example embodiments described herein.

Turning now to FIG. 4, graphs are provided illustrating the operation status of chillers during collection of data. In one or more embodiments, chiller degradation may be best monitored if there is a continuous set of data from sensors 310-370. In one or more embodiments, chiller degradation monitoring is optimized when there are as few missing or erroneous data values as possible. In one or more embodiments, filtering is performed to optimize the chiller efficiency dataset.

In one or more embodiments, graph 410 represents a chiller's operation status. The x-axis of the graph represents time, with bar 430 being present when the chiller is operating. In one or more embodiments, as shown in graph 410, a chiller may operate intermittently. In one or more embodiments, during periods without bar 430 represented, the chiller is not operating. In one or more embodiments, degradation is not occurring while a chiller is not operating. In one or more embodiments, filtering is applied by compressing the data represented in graph 410. In one or more embodiments, as shown in graph 420, the data from graph 410 is compressed to form a continuous series of time samples. In one or more embodiments, time gaps are skipped in data processing. In one or more embodiments, the time gaps which are skipped describe periods when the chiller is not operating (as degradation is not occurring). In one or more embodiments, a natural time scale is substituted by a pure operating hours time scale. In one or more embodiments, in a time interval where the chiller is operating but there is missing or erroneous data, substitution of missing values is used but this time interval is not skipped. In one or more embodiments, time samples used in the continuous set of data are 10 minutes long. In one or more embodiments, time samples used may be a period of time less than or greater than 10 minutes.

Figure 5:
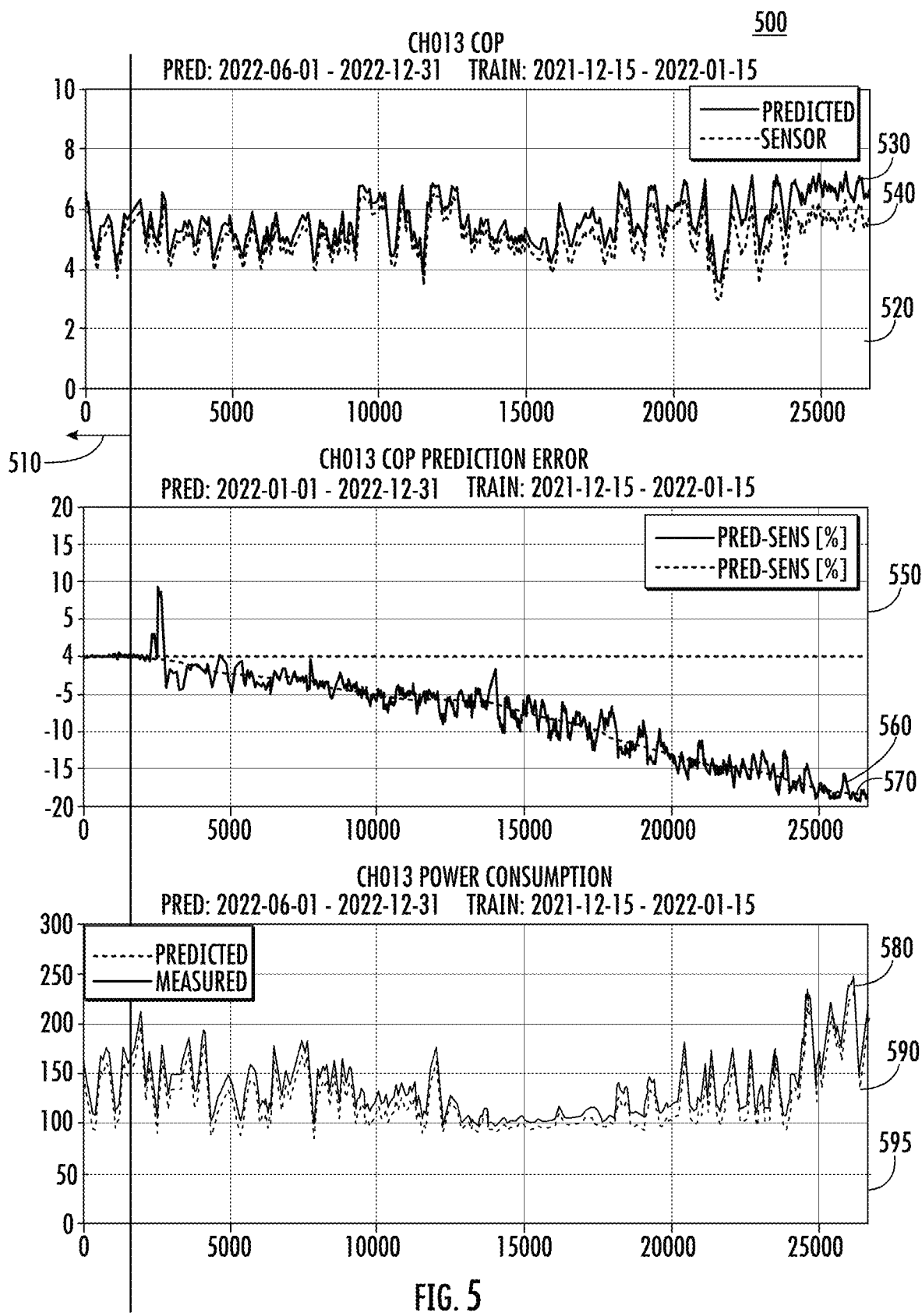
FIG. 5 illustrates example chiller analysis graphs, in accordance with some example embodiments described herein.

Turning now to FIG. 5, a plurality of graphs are provided representing collected and predicted chiller efficiency data. In one or more embodiments, graph 520 represents a graph of the predicted and actual coefficient of performance of a chiller. In one or more embodiments, coefficient of performance (COP) is a parameter used to determine the efficiency of a chiller.

In one or more embodiments, COP is calculated using the equation $COP = p_{evap}/p_{comp}$. In one or more embodiments, $p_{evap}$ describes heat absorbed by an evaporator (effective cooling). In one or more embodiments, $p_{evap}$ is measured by a specialized calorimeter. In one or more embodiments, $p_{evap}$ is calculated from synchronous data collected from sensors 340-360 using the equation. $p_{evap} = c*\rho*chwflow*(chwrtemp - chwstemp)$. In one or more embodiments, $\rho$ describes specific heat and c describes specific mass of water of mean evaporator temperature (mean of chwrtemp and chwstemp). In one or more embodiments, COP is calculated using the equation $COP = (p_{cond}/p_{comp}) - 1$. In one or more embodiments, $p_{cond}$ comprises heat dissipated by the condenser. In one or more embodiments, $p_{cond}$ is directly measured by a specialized calorimeter. In one or more embodiments, $p_{cond}$ is calculated from synchronous data collected from sensors 310-330 using the equation $p_{cond} = c*\rho*cwflow*(cwrtemp - cwstemp)$. In one or more embodiments, $\rho$ describes specific heat and c describes specific mass of water of mean condenser temperature (mean of cwrtemp and cwstemp). In one or more embodiments, chilled medium mass flow rate can be used as a substitute for c*chwflow as chwmassflow. In one or more embodiments, cooling medium mass flow rate can be used as a substitute for c*cwflow as cwmassflow. In one or more embodiments, these formulas are applied when the cooling medium and chilled medium comprise water. In alternative embodiments, analogous formulas may be used for alternative mediums such as gas.

In one or more embodiments, predicted COP is determined using the equation COP=$f$(cwrtemp,chwrtemp,$p_{evap}$), where $f$ represents a machine learning model, for example, an artificial neural network or XGBoost. In one or more embodiments, the model training uses quantities from both sides of the equation. In one or more embodiments, the machine learning algorithm reads and processes input data and COP from the training interval. In one or more embodiments, during training, internal parameters of the model represented by function "$f(\ )$" are tuned to minimize the difference calculated by diff=COP–$f$(cwrtemp, chwrtemp, $p_{evap}$). In one or more embodiments, cwrtemp is determined based on temperature data read at sensor 310 over a time interval. In one or more embodiments, chwrtemp is determined based on temperature data read at sensor 340 over a time interval. In one or more embodiments, $p_{evap}$ represents cooling capacity of the chiller over a time interval. In one or more embodiments, $p_{evap}$ is calculated based on the performance of the chiller. In one or more embodiments, $p_{evap}$ is calculated by using the equation $p_{evap}$=c*ρ*chwflow*(chwrtemp−chwstemp). In one or more embodiments, other input variables may be used to calculate the coefficient of performance. In one or more embodiments, other arguments of function $f$ may be used to model the coefficient of performance if degradation remains as it is during the training interval 510. For example, in an example embodiment, coefficient of performance may be modeled based on COP=$f$(cwstemp,chwstemp,$p_{evap}$). In one or more embodiments, parameters of the model $f$ are determined by training based on the first data set.

In one or more embodiments, a machine learning model is trained based on the coefficient of performance over a first time period. In one or more embodiments, the time period for which the machine learning model is trained is the time period 510. In one or more embodiment, the machine learning model is trained based on the chiller operations data and chiller efficiency data collected at any of sensors 310-370. In one or more embodiments, the machine learning model comprises a regression model. In one or more embodiments, the machine learning model comprises an XGBoost model. In one or more embodiments, the machine learning model may comprise an artificial neural network. In one or more embodiments, the machine learning model generates a data prediction based on the chiller operations data and chiller efficiency data during the first time period and the chiller operations data collected during a second time period. In one or more embodiments, the data prediction is represented by line 530. In one or more embodiments, the data prediction predicts the chiller efficiency data based on an assumption of zero degradation. In one or more embodiments, the data prediction predicts the chiller efficiency data based on a level of degradation during training interval 510. In one or more embodiments, the data prediction predicts the chiller efficiency data based on a mean but constant degradation during a whole evaluated training interval 510. In one or more embodiments, the data prediction comprises a predicted coefficient of performance. In one or more embodiments, the data prediction predicts a coefficient of performance over a second time period. In one or more embodiments, actual coefficient of performance is compared to predicted coefficient of performance over the course of the second time period. In one or more embodiments, predicted and actual coefficient of performance varies as ambient conditions change over time, which leads to nonlinear curves. In one or more embodiments, actual coefficient of performance is represented by line 540. In one or more embodiments, actual coefficient of performance is calculated based on data read from sensors 310-370.

In one or more embodiments, graph 550 represents the coefficient of performance prediction error over the course of the second time period. In one or more embodiments, the difference between the actual coefficient of performance 540 and the modeled baseline coefficient of performance 530 describes coefficient of performance degradation as a percentage of nondegraded coefficient of performance 530. In one or more embodiments, this difference is represented by line 560. In one or more embodiments, line 560 is smoothed into line 570 using the methods described above with the data from sensors 310-370. In one or more embodiments, the coefficient of performance prediction error moves further away from zero over time, showing degradation of a chiller.

In one or more embodiments, graph 595 represents the impact of the coefficient of performance decrease on the chiller power consumption. In one or more embodiments, a decrease in coefficient of performance results in an increase in chiller power consumption. In one or more embodiments, the data prediction comprises a predicted chiller power consumption over the second time period represented by line 590. In one or more embodiments, the actual chiller power consumption is measured over the second time period and is represented by line 580. In one or more embodiments, the difference between predicted power consumption 590 and actual power consumption 580 describes an increase in chiller power consumption. In one or more embodiments, an amount of energy wasted can be calculated based on the increase in chiller power consumption. In one or more embodiments, for chillers with variable speed compressors capable of changing cooling capacity, wasting is determined as a difference between an actual instantaneous energy consumption and a consumption determined in the data prediction for the same cooling capacity. In one or more embodiments, an excess expenditure value can be calculated based on the amount of energy wasted.

Figure 6A:
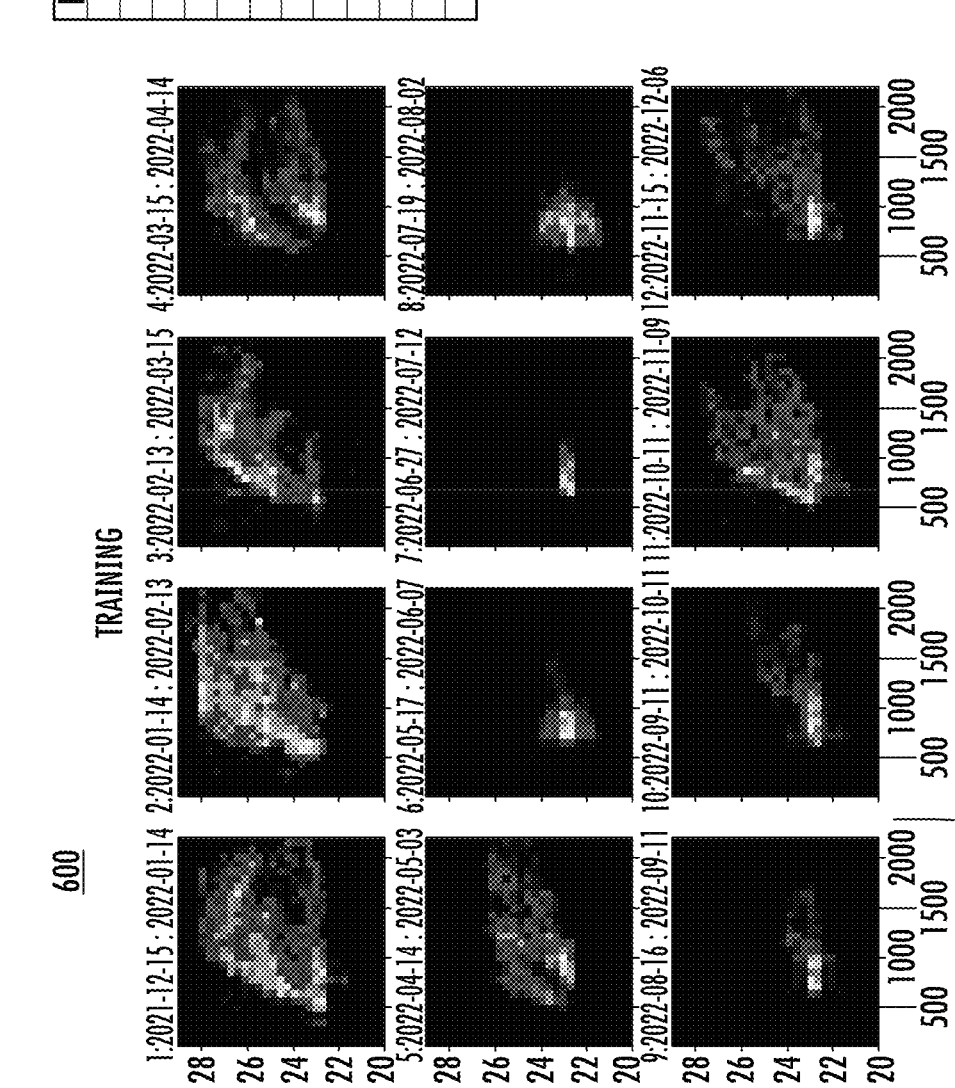
FIGS. 6A-6C illustrates example chiller data levels, in accordance with some example embodiments described herein.

Turning now to FIG. 6A, a series data maps 610 are illustrated. In one or more embodiment, the data maps 610 of FIG. 6A represent data maps of chiller model inputs over a respective time period. In one or more embodiments, the spread of data relevant to modeling is examined. In one or more embodiment, a 2D model is provided for graphical display. In one or more embodiments, higher dimensional data may be displayed with a tabular representation. In one or more embodiments, each data map of FIG. 6A represents a time period of 30 days. In one or more embodiments, the time period of the data maps in FIG. 6A correspond to the time period of the table 620 in FIG. 6B. In one or more embodiments, the chiller operations data represented in data maps 610 described cooling water return temperature and cooling load which are relevant for selected COP model. In one or more embodiments, the x-axis of data maps 610 represent cooling load and the y axis of data maps 610 represent cwrtemp. In one or more embodiments, a most appropriate training data period is selected based on a range of possible input data in each period. In one or more embodiments, a larger amount of data bins represented in data maps 610 represent a larger data spread of possible input data. In one or more embodiments, a larger measure of suitability for a training period corresponds to a larger score in table 620 of FIG. 6B. In one or more embodiments, a score corresponds to a number of nonzero bins in a training space. In one or more embodiments, the highest score listed in table 620 indicates that the corresponding time period is most suitable as a training period. In one or more embodiments, graphical evaluation or coverage score may be preferred for selecting a training period. In one or more embodiments, graphical evaluation may be preferred for reading by humans. In one or more embodiments, automatic selection of a training interval may be performed using the coverage score.

Figure 6B:
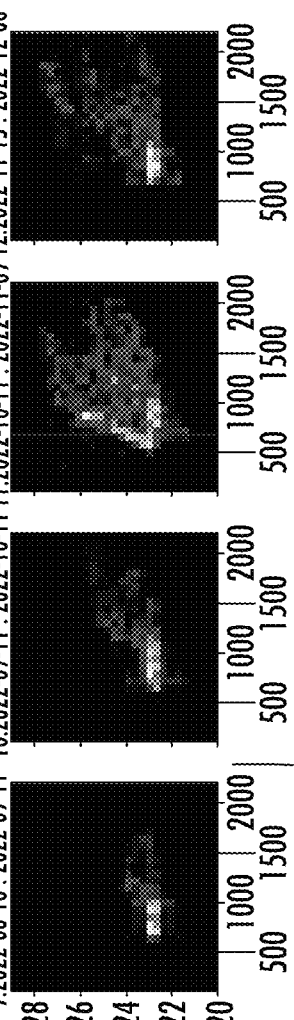
Figure 6C:
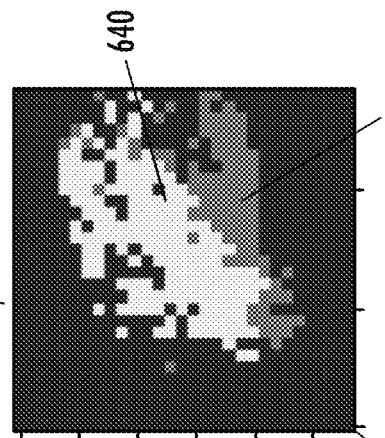

In one or more embodiments, the coverage score in table 620 compares training data to a reference predefined region in the input space. In one or more embodiments, data can be retrieved from the prediction interval as a reference set and a more specific criterion of the similarity of the training and prediction input data may be obtained. FIG. 6C illustrates an overlay of prediction inputs covered by training data in area 640 and prediction inputs not covered by training data in area 650. In one or more embodiments, a larger area 640 indicates a more suitable time period for training and results in a higher coverage score. In one or more embodiments, absolute coverage score indicates a total amount of overlapping data and a relative coverage score indicates an amount of overlapping data relative to the amount of prediction data. In one or more embodiments, a coverage score is preferred over graphical evaluation where the model is created in a space of higher than two dimensions for computer processing.

Figure 7:
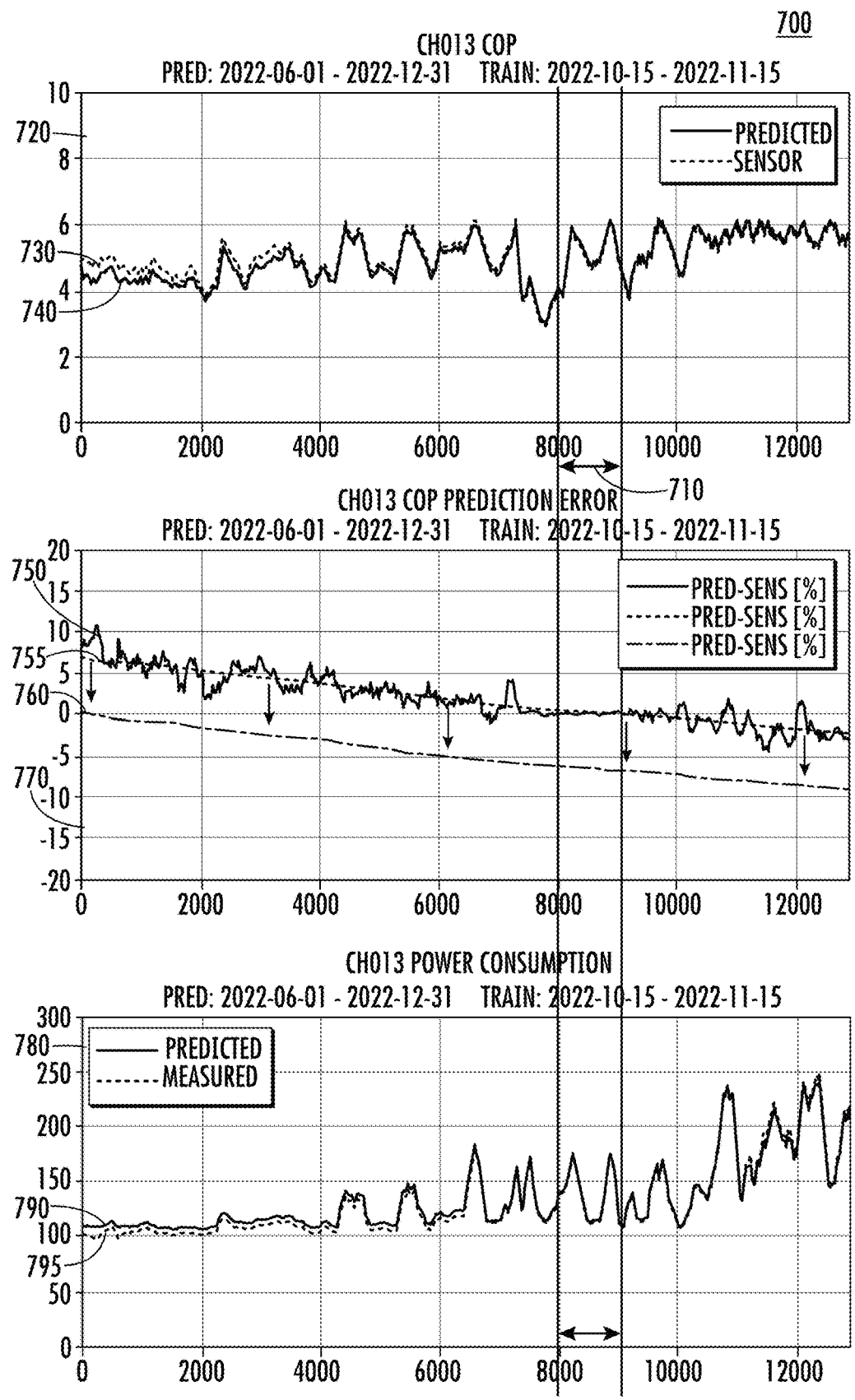
FIG. 7 illustrates example chiller analysis graphs with a later training interval, in accordance with some example embodiments described herein.

Turning now to FIG. 7, a series of graphs is illustrated representing chiller efficiency degradation with a training period selected after degradation has begun in the chiller. In one or more embodiment, a later training interval may be selected after any amount of degradation has occurred. For example, the earliest possible training interval may have a data map or score indicating that the amount of data available during that period is not suitable for training. For example the first data map in FIG. 6A is inferior and first coverage score in FIG. 6B is lower than later coverage maps or scores. In one or more embodiments, in this circumstance, a later training interval 710 is selected. In one or more embodiments, predicted coefficient of performance is then predicted after the training interval and additionally and/or alternatively predicted before the training interval based on level of chiller efficiency degradation at the time of training. In one or more embodiments, a predicted coefficient of performance is represented by line 740. In one or more embodiments, an actual coefficient of performance is represented by line 730. In one or more embodiments, the predicted coefficient of performance is lower in line 740 than for 730 at the beginning of the whole monitored interval. In one or more embodiments, graph 770 represents the coefficient of performance prediction error based on graph 720. In one or more embodiments, line 750 represents the coefficient of performance prediction error based on the difference between the lines 740 and 730 of graph 720. In one or more embodiments, the data of line 750 is smoothed into line 755. In one or more embodiments, the smoothed coefficient of performance prediction error line 755 is shifted downwards so that it begins at a coefficient of performance prediction error of 0. In one or more embodiments, this results in line 760. In one or more embodiments, line 760 represents a total degradation profile of the chiller efficiency. In one or more embodiments, line 760 describes a coefficient of performance prediction error line that would result from a training interval taking place when the chiller is not degraded or minimally degraded. In one or more embodiments, the coefficient of performance prediction error line 760 comprises a chiller degradation line. In one or more embodiments, power consumption is predicted in graph 780. In one or more embodiments, predicted power consumption is represented by line 790 and measured power consumption is represented by line 795. In one or more embodiments, a difference in predicted power consumption and measured power consumption can be shifted similar to the shift in graph 770. In one or more embodiments, an excess expenditure value can be calculated based on the difference in power consumption.

Figure 8:
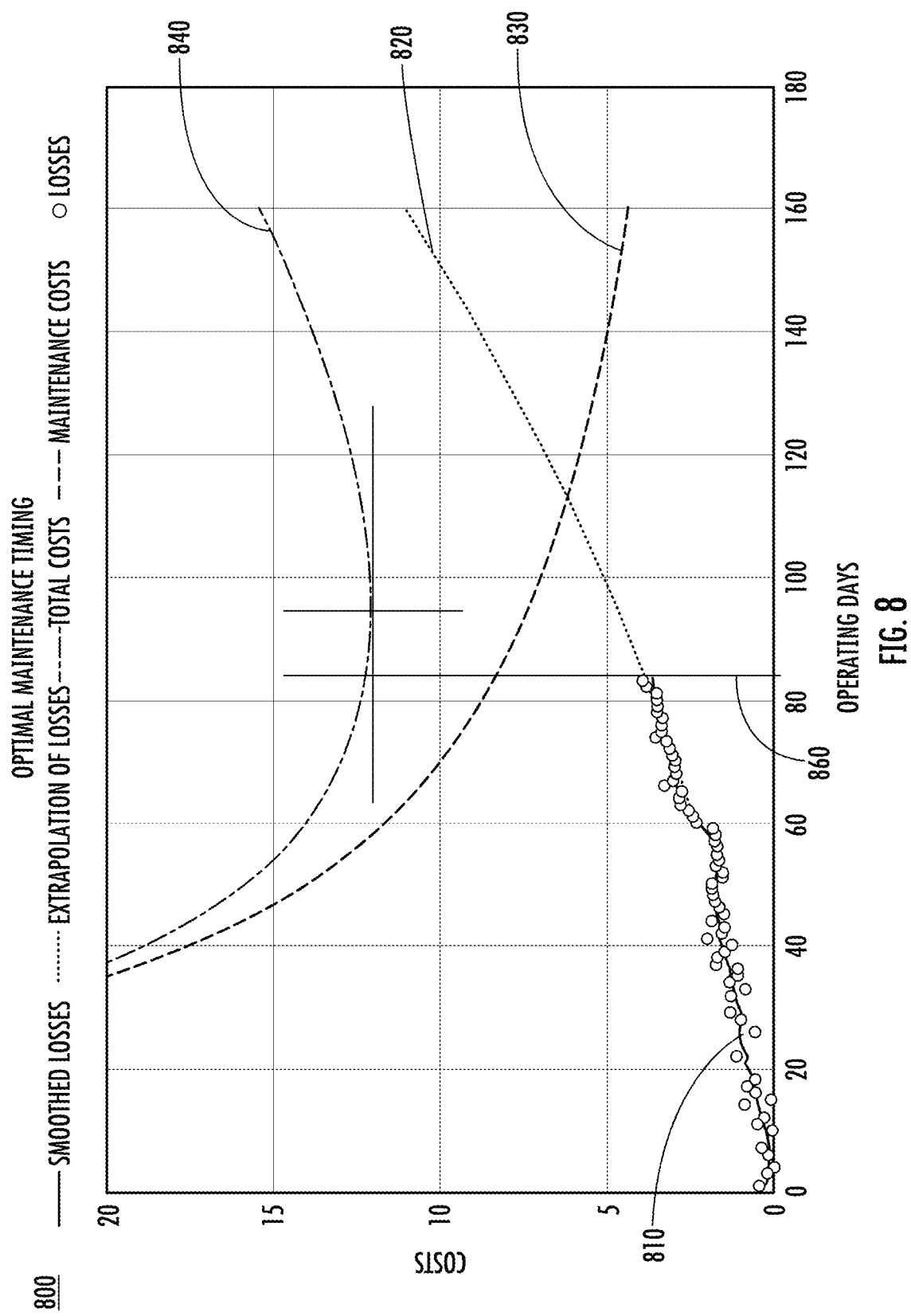
FIG. 8 illustrates an example graph for determining optimal maintenance time, in accordance with some example embodiments described herein.

Turning now to FIG. 8, a graph 800 is illustrated that can be used to calculate an optimal maintenance time for one or more chillers. In one or more embodiments, line 810 describes the excess expenditure value caused by chiller degradation. In one or more embodiments, line 810 may be determined based on the monetized difference in power consumption between the predicted data set and the data collected from sensor 370. In one or more alternative embodiments, any combination of data from sensors 310-370 may be used. In one or more embodiments, the data is collected over daily intervals. In one or more embodiments, line 810 may be determined based on a difference between predicted coefficient of performance and actual coefficient of performance over a time interval. In one or more embodiments, line 810 may be determined based on a coefficient of performance prediction error. In one or more embodiments, line 810 may be smoothed.

In one or more embodiments, line 820 is determined based on line 810. In one or more embodiments, line 810 may be extrapolated to produce line 820. In one or more embodiments, line 820 may be predicted into the future. In one or more embodiments, line 820 describes past degradation losses and future predicted degradation losses.

In one or more embodiments, line 830 represents the cost of maintenance to the chiller. For example, in one or more embodiments, line 830 defines a maintenance cost budget per day. In one or more embodiments, time intervals used to generate line 810 and 830 are equal (e.g., daily intervals).

In one or more embodiments, line 820 and line 830 are combined, for example by totaling or otherwise via summation, to produce line 840. In one or more embodiments, line 840 describes a total cost of operation. In one or more embodiments, line 840 may be given in units of budget per day. In one or more embodiments, line 840 is calculated by determining the cost of maintenance added to the losses caused by degradation of the chiller. In one or more embodiments, line 860 represents a current time. In one or more embodiments, the bottom of the line 840 is the expected optimal point of maintenance 850.

Figure 9:
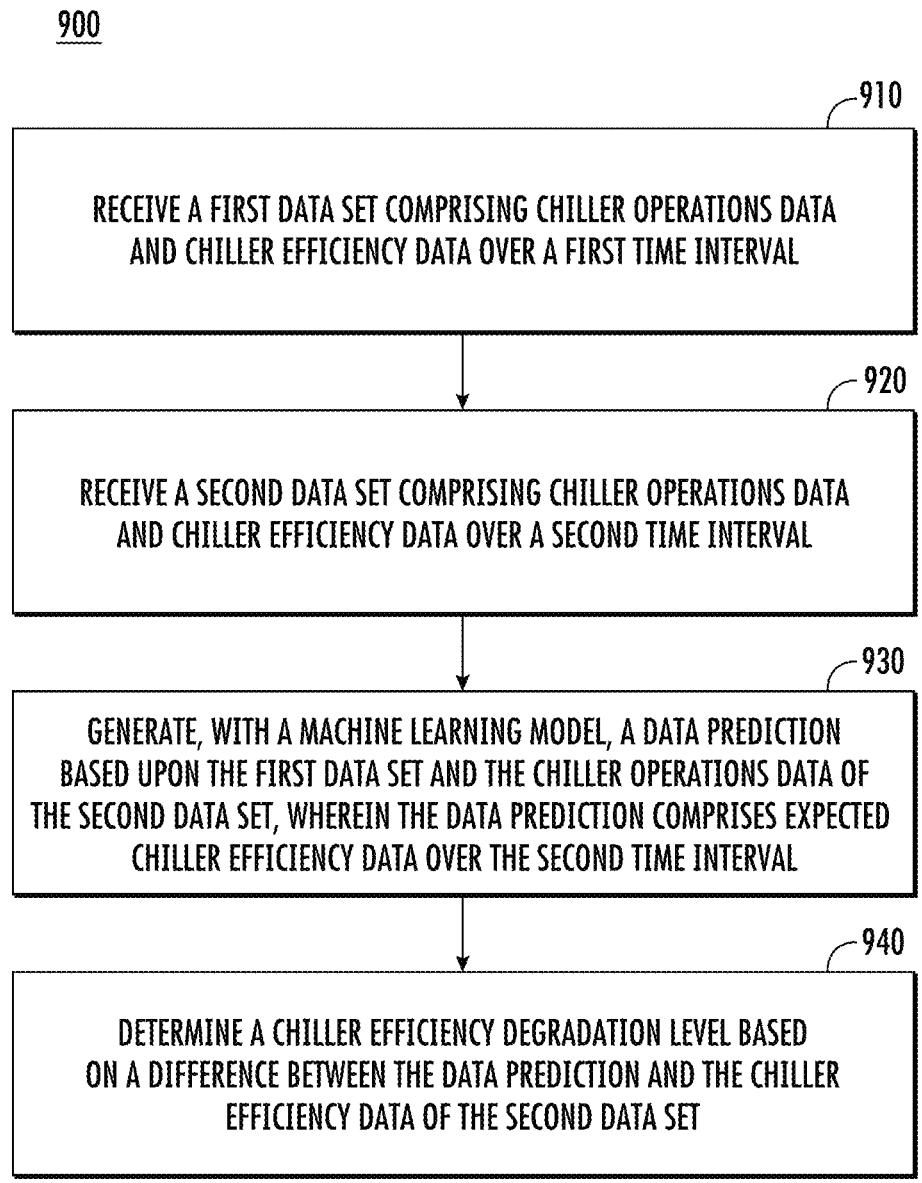
FIG. 9 illustrates an example flowchart for determining a chiller efficiency degradation level, in accordance with some example embodiments described herein.

Turning now to FIG. 9, a flowchart 900 is shown for determining a chiller efficiency degradation level. The operations illustrated in FIG. 9 may, for example, be performed by, with the assistance of, and/or under the control of an apparatus (e.g., chiller efficiency server 108), as described above. In this regard, performance of the operations may invoke one or more of processor 202, memory 204, input/output circuitry 206, communications circuitry 208, forecasting circuitry 210, and/or display circuitry 212.

As shown in operation 910 of FIG. 9, the apparatus (e.g., chiller efficiency server 108) includes means, such as input/output circuitry 206, communications circuitry 208, or the like, for receiving a first data set comprising chiller operations data and chiller efficiency data over a first time interval. In one or more embodiments, the chiller operations data of the first data set comprises temperatures of a cooling medium entering and/or leaving a condenser. In one or more embodiments, the chiller operations data of the first data set comprises temperatures of a chilled medium entering and/or leaving an evaporator. In one or more embodiments, the first data set comprises entering temperatures of the chilled medium and cooling medium along with leaving temperatures of the either the cooled medium or chilled medium. In one or more embodiments, the chiller operations data of the first data set comprises volumetric or mass flow rates of the cooling medium entering or leaving a condenser. In one or more embodiments, the chiller operations data of the first data set comprises volumetric or mass flow rates of the chilled medium entering or leaving the evaporator. In one or more embodiments, the chiller operations data of the first data set comprises power consumption of a compressor associated with the chiller. In one or more embodiments, the chiller operations data of the first data set is collected from sensors 106. In one or more embodiments, chiller operations data of the first data set is collected from sensors including one or more of sensors 310-370. In one or more embodiments, the chiller efficiency data of the first data set comprises a coefficient of performance. In one or more embodiments, the chiller efficiency data set of the first data set comprises power consumption. In one or more embodiments, the chiller efficiency data of the first data set comprises measured efficiency. In one or more embodiments, the chiller efficiency data of the first data set is calculated based on the chiller operations data of the first data set. Many examples of efficiency indicators may be used in chiller efficiency data. Efficiency of coolers may be tracked in different ways across different embodiments. In one or more embodiments, the apparatus (e.g., chiller efficiency server 108) may include means, such as the processor 202, forecasting circuitry 210, or the like, for determining the first time interval based at least on a temperature of a cooling medium entering a condenser and a cooling demand load. In one or more embodiments, a higher amount of data of cooling medium temperature and cooling demand load corresponds to a time interval with greater suitability. In one or more embodiments, other data influencing operation of the chiller may be used to determine the first time interval. In one or more embodiments, all data that are chosen as machine learning model inputs are eligible to be used for determining the first time interval. In one or more embodiments, a first data set collected during a time interval with high suitability will result in more comprehensive training for a machine learning model. In one or more embodiments, the apparatus (e.g., chiller efficiency server 108) includes means, such as processor 202, forecasting circuitry 210, or the like, for smoothing the first data set, wherein the first data set is smoothed based at least on a third time interval that is longer than a basic sampling time interval and encompasses the basic sampling time interval. For example, a one minute set of data over a basic sampling time interval may be smoothed based on a ten minute third time interval. In one or more embodiments, smoothing is performed before data processing. In one or more embodiments, smoothing is performed after data processing. In one or more embodiments, data may be smoothed before and after data processing.

As shown in operation 920 of FIG. 9, the apparatus (e.g., chiller efficiency server 108) includes means, such as input/output circuitry 206, communications circuitry 208, or the like, for receiving a second data set comprising chiller operations data and chiller efficiency data over a second time interval. In one or more embodiments, the chiller operations data of the second data set comprises temperatures of a cooling medium entering and/or leaving a condenser. In one or more embodiments, the chiller operations data of the second data set comprises temperatures of a chilled medium entering and/or leaving an evaporator. In one or more embodiments, the chiller operations data of the second data set comprises entering temperatures of both the cooling medium and chilled medium and leaving temperatures of either the cooling medium or chilled medium. In one or more embodiments, the chiller operations data of the second data set comprises volumetric or mass flow rates of the cooling medium entering or leaving a condenser. In one or more embodiments, the chiller operations data of the second data set comprises volumetric or mass flow rates of the chilled medium entering or leaving the evaporator. In one or more embodiments, the chiller operations data of the second data set comprises power consumption of a compressor associated with the chiller. In one or more embodiments, the chiller operations data of the second data set is collected from sensors 106, including zero or more of sensors 310-370. In one or more embodiments, the chiller efficiency data of the second data set comprises a coefficient of performance. In one or more embodiments, the chiller efficiency data set of the second data set comprises power consumption. In one or more embodiments, the chiller efficiency data of the second data set comprises measured efficiency. In one or more embodiments, the chiller efficiency data of the second data set is calculated based on the chiller operations data of the second data set. Many examples of efficiency indicators may be used in chiller efficiency data. Efficiency of coolers may be tracked in different ways across different embodiments.

As shown in operation 930 of FIG. 9, the apparatus (e.g., chiller efficiency server 108) includes means, such as processor 202, forecasting circuitry 210, or the like, for generating, with the machine learning model, a data prediction based upon the first data set and the chiller operations data of the second data set, wherein the data prediction comprises expected chiller efficiency data over the second time interval. In one or more embodiments, the data prediction set comprises predicted coefficient of performance. In one or more embodiments, the data prediction comprises predicted power consumption. In one or more embodiments, the machine learning model comprises a regression model. In one or more embodiments, the machine learning model comprises an XGBoost model. In one or more embodiments, the machine learning model comprises an artificial neural network. In one or more embodiments, the machine learning model is trained based on the first data set.

As shown in operation 940 of FIG. 9, the apparatus (e.g., chiller efficiency server 108) includes means, such as input/output circuitry 206, communication circuitry 208, or the like, for determining a chiller efficiency degradation level. In some embodiments, the chiller efficiency degradation level is determined based on a difference between the data prediction and the chiller efficiency data of the second data set.

Figure 10:
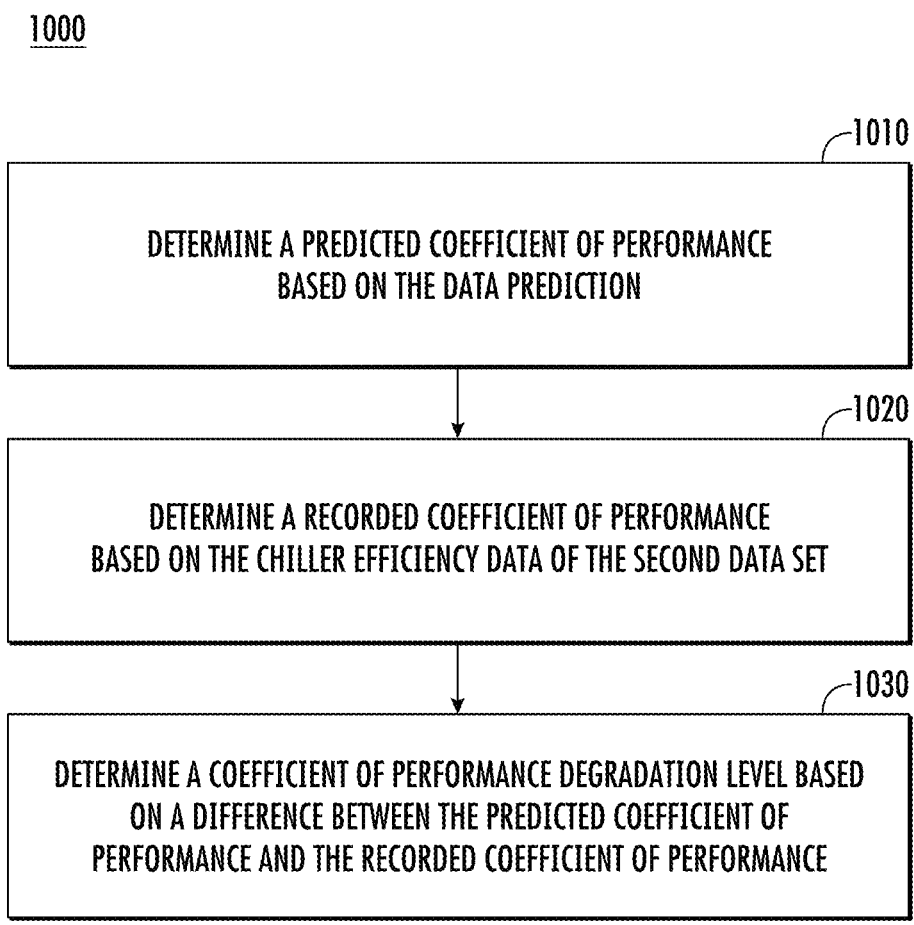
FIG. 10 illustrates an example flowchart for determining a coefficient of performance degradation level, in accordance with some example embodiments described herein.

Turning now to FIG. 10, a flowchart 1000 is shown for determining a coefficient of performance degradation level. The operations illustrated in FIG. 9 may, for example, be performed by, with the assistance of, and/or under the control of an apparatus (e.g., chiller efficiency server 108), as described above. In this regard, performance of the operations may invoke one or more of processor 202, memory 204, input/output circuitry 206, communications circuitry 208, forecasting circuitry 210, and/or display circuitry 212.

As shown in operation 1010 of FIG. 10, the apparatus (e.g., chiller efficiency server 108) includes means, such as processor 202, forecasting circuitry 210, or the like, for determining a predicted coefficient of performance based on the data prediction. In one or more embodiments, the predicted coefficient of performance is determined based further on the first data set comprising chiller operations data (e.g., by training the machine learning model with the chiller operations data). In one or more embodiments, the predicted coefficient of performance is calculated based on the data prediction using the equation COP=$f$(cwrtemp,chwrtemp, $p_{evap}$), where the function $f$ represents the trained model.

As shown in operation 1020 of FIG. 10, the apparatus (e.g., chiller efficiency server 108) includes means, such as processor 202, forecasting circuitry 210, or the like, for determining a recorded coefficient of performance based on the chiller efficiency data of the second data set. In one or more embodiments, the predicted coefficient of performance is calculated based at least in part on the chiller operations data of the second data set.

As shown in operation 1030 of FIG. 10, the apparatus (e.g., chiller efficiency server 108) includes means, such as processor 202, forecasting circuitry 210, or the like, for determining a coefficient of performance degradation level based on a difference between the predicted coefficient of performance and the recorded coefficient of performance. In one or more embodiments, the apparatus (e.g., chiller efficiency server 108) includes means, such as processor 202, forecasting circuitry 210, or the like, for shifting the coefficient of performance prediction error based at least on the coefficient of performance degradation level. In one or more embodiments, the coefficient of performance prediction error comprises the coefficient of performance degradation level. In one or more embodiments where the second time period at least partially occurs prior to the first time period, the coefficient of performance prediction error may be shifted downwards to a baseline of zero at the beginning of the monitoring, such that the entire progress of degradation is shown from the beginning of the monitoring. In one or more embodiments, this results in a total degradation profile. In one or more embodiments, the apparatus (e.g., chiller efficiency server 108) further includes means, such as processor 202, forecasting circuitry 210, or the like, for determining an amount of energy wasted based on the coefficient of performance degradation level. In one or more embodiments, the amount of energy wasted may be determined based on a difference in power consumption between the data prediction and the second data set. In one or more embodiments, the amount of energy wasted may be determined based on a difference in power consumption between a shifted data prediction and the second data set. In one or more embodiments, the apparatus (e.g., chiller efficiency server 108) includes means, such as processor 202, forecasting circuitry 210, or the like, for determining an excess expenditure value time profile based on the amount of energy wasted. In one or more embodiments, the excess expenditure value time profile can be predicted into the future using the machine learning model. In one or more embodiments, the apparatus (e.g., chiller efficiency server 108) includes means, such as processor 202, forecasting circuitry 210, or the like, for determining an optimal maintenance time based on the excess expenditure value and a cost of maintenance. In one or more embodiments, the excess expenditure value per day may be added to the per day cost of maintenance. In one or more embodiments, the lowest total of the excess expenditure value per day and the per day cost of maintenance describes the expected optimal maintenance time.

FIGS. 9-10 thus illustrate flowcharts describing the operation of apparatuses, methods, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 204 of chiller efficiency server 108 and executed by a processor 202 of the chiller efficiency server 108. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for determining efficiency degradation of chillers, the apparatus comprising at least one processor and at least one non-transitory memory including computer-coded instructions thereon, the computer-coded instructions configured to, with the at least one processor, cause the apparatus to:

receive a first data set comprising chiller operations data and chiller efficiency data over a first time interval;

receive a second data set comprising chiller operations data and actual chiller efficiency data over a second time interval;

generate, with a machine learning model, a data prediction based upon the first data set and the chiller operations data of the second data set, wherein the data prediction comprises expected chiller efficiency data over the second time interval;

determine a chiller efficiency degradation level based on a difference between the data prediction and the actual chiller efficiency data of the second data set for the second time interval wherein the data prediction comprises expected chiller efficiency data;

determine a predicted coefficient of performance based on the data prediction and a recorded coefficient of performance based on the actual chiller efficiency data of the second data set;

determine a coefficient of performance degradation level based on a difference between the predicted coefficient of performance and the recorded coefficient of performance; and determine a coefficient of performance prediction error based at least on the coefficient of performance degradation level, wherein the coefficient of performance prediction error is shifted such that its initial value corresponds to a baseline of zero degradation, thereby enabling a normalized degradation profile over time.

2. The apparatus of claim 1, wherein the chiller operations data of the first data set and the second data set comprises at least one of temperature of a cooling medium entering a condenser, temperature of the cooling medium leaving the condenser, volumetric flow rate of the cooling medium, mass flow rate of the cooling medium, temperature of a chilled medium entering an evaporator, temperature of the chilled medium leaving the evaporator, volumetric flow rate of the chilled medium, mass flow rate of the chilled medium, and compressor power consumption.

3. The apparatus of claim 1, wherein the chiller efficiency data of the first data set, the data prediction, and the second data set comprises at least one of coefficient of performance and power consumption.

4. The apparatus of claim 1, wherein the coefficient of performance prediction error describes a coefficient of performance degradation level over time, and wherein the coefficient of performance prediction error is shifted to begin at a level indicating no degradation.

5. The apparatus of claim 1, the apparatus further caused to: determine an amount of energy wasted over time based on coefficient of performance degradation level.

6. The apparatus of claim 5, the apparatus further caused to:

determine an excess expenditure value time profile based on the amount of energy wasted.

7. The apparatus of claim 6, the apparatus further caused to:

determine an optimal maintenance time based on the excess expenditure value time profile and a cost of maintenance.

8. The apparatus of claim 1, the apparatus further caused to:

determine the first time interval based at least on a temperature of a cooling medium entering a condenser and a cooling demand load.

9. The apparatus of claim 1, the apparatus further caused to:

smooth the first data set, wherein the first data set is smoothed based at least on a third time interval that is longer than a basic sampling time interval and encompasses the basic sampling time interval.

10. The apparatus of claim 1, wherein the machine learning model comprises a regression model.

11. The apparatus of claim 1, wherein the machine learning model is trained based on the first data set.

12. A computer-implemented method, comprising:

receiving a first data set comprising chiller operations data and chiller efficiency data over a first time interval;

receiving a second data set comprising chiller operations data and actual chiller efficiency data over a second time interval;

generating, with a machine learning model, a data prediction based upon the first data set and the chiller operations data of the second data set, wherein the data prediction comprises expected chiller efficiency data over the second time interval;

determining a chiller efficiency degradation level based on a difference between the data prediction and the actual chiller efficiency data of the second data set for the second time interval wherein the data prediction comprises expected chiller efficiency data;

determining a predicted coefficient of performance based on the data prediction and a recorded coefficient of performance based on the actual chiller efficiency data of the second data set;

determining a coefficient of performance degradation level based on a difference between the predicted coefficient of performance and the recorded coefficient of performance; and determining a coefficient of performance prediction error based at least on the coefficient of performance degradation level, wherein the coefficient of performance prediction error is shifted such that its initial value corresponds to a baseline of zero degradation, thereby enabling a normalized degradation profile over time.

13. The computer-implemented method of claim 12, wherein the chiller operations data of the first data set and the second data set comprises at least one of temperature of a cooling medium entering a condenser, temperature of the cooling medium leaving the condenser, volumetric flow rate of the cooling medium, mass flow rate of the cooling medium, temperature of a chilled medium entering an evaporator, temperature of the chilled medium leaving the evaporator, volumetric flow rate of the chilled medium, mass flow rate of the chilled medium, and compressor power consumption.

14. The computer-implemented method of claim 12, wherein the chiller efficiency data of the first data set, the data prediction, and the second data set comprises at least one of coefficient of performance and power consumption.

15. The computer-implemented method of claim 12, wherein the coefficient of performance prediction error describes a coefficient of performance degradation level over time, and wherein the coefficient of performance prediction error is shifted to begin at a level indicating no degradation.

16. A computer program product comprising at least one non-transitory computer-readable storage medium having computer program code stored thereon that, in execution with at least one processor, is configured for:
- receiving a first data set comprising chiller operations data and chiller efficiency data over a first time interval;
- receiving a second data set comprising chiller operations data and actual chiller efficiency data over a second time interval;
- generating, with a machine learning model, a data prediction based upon the first data set and the chiller operations data of the second data set, wherein the data prediction comprises expected chiller efficiency data over the second time interval;
- determining a chiller efficiency degradation level based on a difference between the data prediction and the actual chiller efficiency data of the second data set for the second time interval wherein the data prediction comprises expected chiller efficiency data; and
- determining a predicted coefficient of performance based on the data prediction and a recorded coefficient of performance based on the actual chiller efficiency data of the second data set;
- determining a coefficient of performance degradation level based on a difference between the predicted coefficient of performance and the recorded coefficient of performance; and
- determining a coefficient of performance prediction error based at least on the coefficient of performance degradation level, wherein the coefficient of performance prediction error is shifted such that its initial value corresponds to a baseline of zero degradation, thereby enabling a normalized degradation profile over time.

17. The computer program product of claim 16, wherein the chiller operations data of the first data set and the second data set comprises at least one of temperature of a cooling medium entering a condenser, temperature of the cooling medium leaving the condenser, volumetric flow rate of the cooling medium, mass flow rate of the cooling medium, temperature of a chilled medium entering an evaporator, temperature of the chilled medium leaving the evaporator, volumetric flow rate of the chilled medium, mass flow rate of the chilled medium, and compressor power consumption.

18. The computer program product of claim 16, wherein the chiller efficiency data of the first data set, the data prediction, and the second data set comprises at least one of coefficient of performance and power consumption.

* * * * *